(No Model.)

W. J. YOUNG.
TOOTH AND TOOTH CARRIER FOR DIGGING MACHINES.

No. 416,982. Patented Dec. 10, 1889.

WITNESSES:
D. C. Reusch
C. Sedgwick

INVENTOR:
W. J. Young
BY
Munn & Co.
ATTORNEYS.

UNITED STATES PATENT OFFICE.

WILLIAM J. YOUNG, OF CENTREVILLE, ST. MARY'S PARISH, LOUISIANA.

TOOTH AND TOOTH-CARRIER FOR DIGGING-MACHINES.

SPECIFICATION forming part of Letters Patent No. 416,982, dated December 10, 1889.

Application filed August 24, 1889. Serial No. 321,839. (No model.)

*To all whom it may concern:*

Be it known that I, WILLIAM J. YOUNG, of Centreville, in the parish of St. Mary's and State of Louisiana, have invented a new and useful Improvement in the Teeth and Teeth-Carriers of Stubble-Digging Machines, of which the following is a full, clear, and exact description.

My invention relates to an improvement in the teeth and teeth-carriers of stubble-digging machines, and has for its object to provide a means whereby should the teeth become broken the carrier may be expeditiously and conveniently manipulated to remove the broken tooth, or should any of the teeth become bent the same may be readily and quickly detached and straightened.

The invention consists in the novel construction and combination of the several parts, as will be hereinafter fully set forth, and pointed out in the claims.

Reference is to be had to the accompanying drawings, forming a part of this specification, in which similar letters and figures of reference indicate corresponding parts in all the views.

Figure 1:
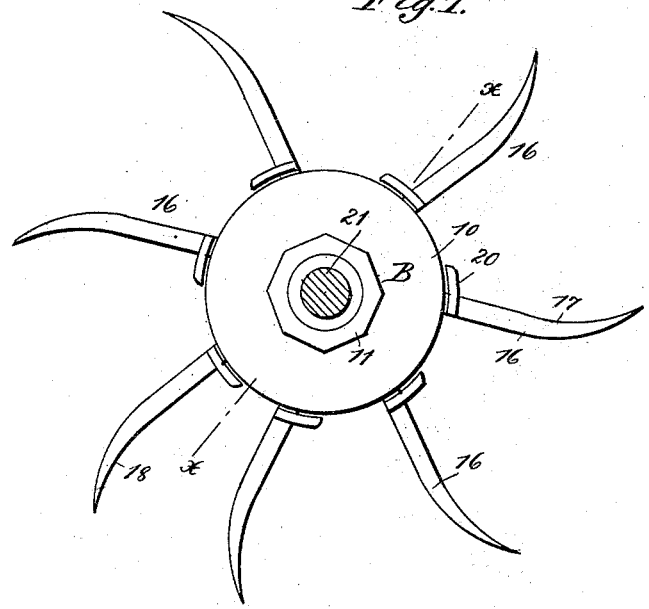
Figure 2:
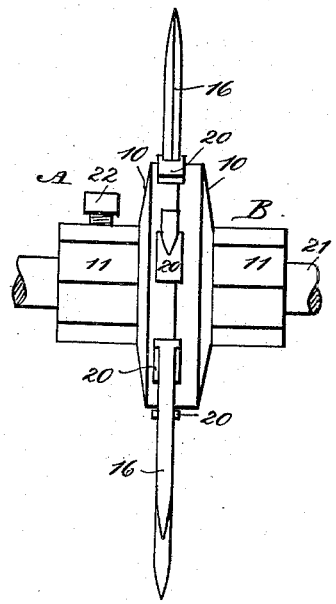
Figure 6:
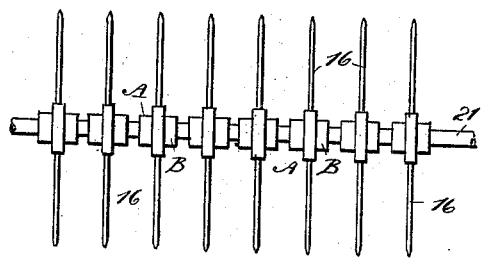
Figures 3, 4:
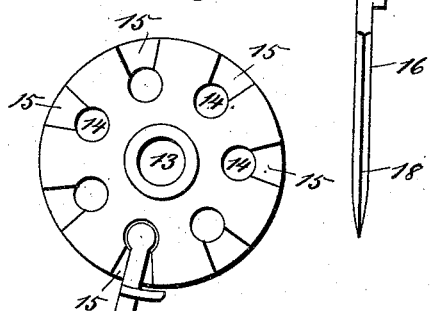
Figure 5:
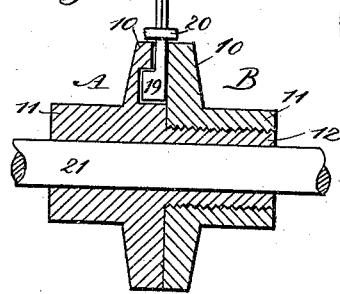

Figure 1 is a side elevation of the tooth-carrier having the teeth inserted therein. Fig. 2 is a front elevation of the same. Fig. 3 is a plan view of one section of the carrier, illustrating a tooth in position. Fig. 4 is a detail front elevation of a detached tooth. Fig. 5 is a transverse section on line *x x* of Fig. 1, and Fig. 6 illustrates a series of carriers attached to a shaft.

The carrier is constructed in two sections A and B. Each section comprises a disk-like body 10, having integral with the outer face a shank or hub 11, which hub is polygonal, as illustrated in Fig. 2, whereby a wrench may be readily applied to disconnect one section from the other.

The section A is provided with an exteriorly-threaded cylindrical post 12, projected from the center of the inner face of the disk-body 10, as is best illustrated in Fig. 5, the said post and the shank 11 of the disk being provided with an interior bore 13 to receive a shaft. The threaded post 12 is adapted to screw into the disk-body 10 and shank 11 of the section B, the said shank and body of this section being to that end provided with an interiorly-threaded bore of sufficient diameter to receive the post 12.

The inner face of the disk or body 10 of the section B is perfectly smooth; but in the inner face of the disk of the opposed section A a series of circular recesses 14 is produced, as shown in Fig. 3, located near the periphery, and in the peripheral surface of the disk essentially wedge-shaped recesses 15 are made, which intersect or lead into the circular recesses 14, as is best illustrated in the same figure.

In connection with the carrier a series of teeth 16 is employed, one tooth being adapted to enter each circular or wedge-shaped recess 14 and 15 of the carrier. The teeth are curved at their outer ends, as illustrated at 17 in Fig. 1, being sharpened or brought to a cutting-edge upon their inner or concave surface, as illustrated at 18 in Fig. 4, the curved extremities being made to terminate in a sharp point. Integral with the head of the tooth a circular stud 19 is formed of sufficient diameter to enter and turn loosely in the circular recesses 14, as shown in Fig. 5, the shank of the tooth near the head having play in the wedge-shaped recess 15. When the heads of the teeth have been inserted in the several pockets, which I denominate the two recesses 14 and 15, their outer faces will be flush with the inner plain surface of the disk 10, as shown in Fig. 5, and they are held in position by the section B being screwed upon the threaded post of the section A. It will be observed that each tooth has lateral play in its recess, and in order to prevent the dirt thrown upward by the contact of the teeth with the ground as the carrier is revolved from entering the recesses 15 at the periphery of the carrier an arm 20 is secured to or made integral with the inner or curved edge of each tooth adjacent to the periphery of the carrier, which arm is of sufficient width to constantly cover the opening of the recess 15, forming thereby an effective guard, as is best shown in Figs. 1 and 2.

I desire it to be understood that any number of carriers may be attached to one or more shafts 21, as shown in Fig. 6, which shaft is mounted in suitable bearings upon the machine and driven in any approved manner. I have illustrated the carriers as attached to the shaft by means of a set-screw 22; but the said set-screw may be substituted by any equivalent device, if so desired.

Having thus described my invention, I claim as new and desire to secure by Letters Patent—

1. In a stubble-digging machine, a tooth-carrier constructed in two disk-like sections, one screwed upon the other, each section being provided with a polygonal shank, and one section having produced in its inner face a series of circular cavities or recesses, and peripheral wedge-shaped recesses leading into the circular recesses, substantially as and for the purpose specified.

2. In a stubble-digging machine, a tooth-carrier consisting of two sections, each section being provided with a disk-like body and a polygonal shank integral with the body, one section having produced in the inner face of the disk a series of circular recesses, and peripheral wedge-shaped recesses leading into the same, and a cylindrical exteriorly-threaded post projected from the center of the inner face of the disk, adapted to enter an interiorly-threaded bore in the disk and shank of the opposite section, substantially as and for the purpose specified.

3. In a stubble-digging machine, the combination, with a carrier comprising two disk-sections, each provided with a polygonal shank, one of the disk-sections having produced upon its inner face a series of circular recesses, and peripheral recesses leading into the same, of teeth adapted to enter the said recesses, curved at their outer ends and provided with a circular integral stud at their inner ends, capable of fitting loosely and turning in the said circular recesses of the carrier, substantially as shown and described.

4. In a stubble-digging machine, the combination, with a carrier comprising two disk-sections, each provided with a polygonal shank, one of the disk-sections having produced upon its inner face a series of circular recesses, and peripheral recesses leading into the same, of teeth adapted to enter the recesses of the carrier, said teeth being curved at their outer ends and provided at the inner ends with a circular stud capable of loosely turning in the circular recesses of the carrier, and an arm projected from the inner edge of each tooth adapted to cover the peripheral recesses of the carrier and to prevent the dirt from entering the same and interfering with the lateral movement of the teeth, substantially as shown and described.

WILLIAM J. YOUNG.

Witnesses:
PLACIDE P. LIGUR,
J. W. LYMAN.